Oct. 12, 1943.    J. J. BURGESS    2,331,653
BRACKET
Filed Nov. 28, 1942
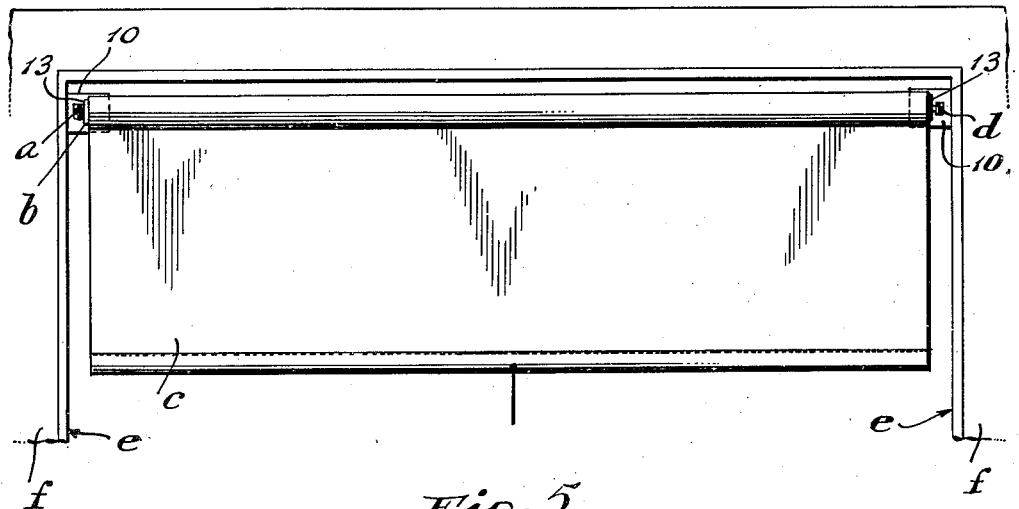
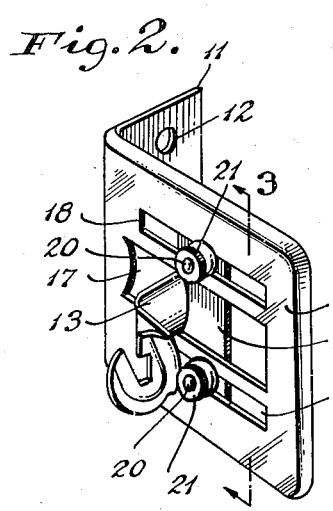
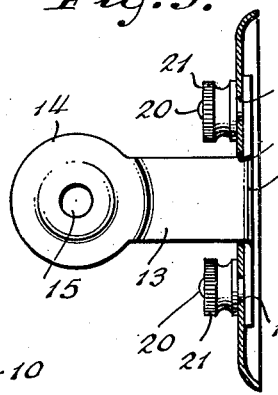
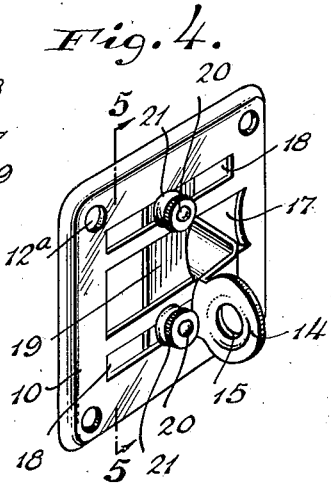
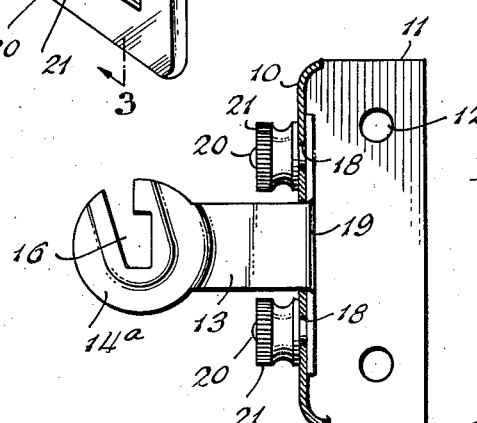
INVENTOR.
JOSEPH J. BURGESS
BY
ATTORNEY Patented Oct. 12, 1943

2,331,653

UNITED STATES PATENT OFFICE 2,331,653

BRACKET

Joseph J. Burgess, Brooklyn, N. Y., assignor to Joseph Cavero, Brooklyn, N. Y.

Application November 28, 1942, Serial No. 467,181

3 Claims. (Cl. 248—271)

The invention relates to brackets and more particularly to brackets for supporting curtaining means and more specifically the rollers of window shades and the like in operative position.

The invention has for its object to provide a bracket of the indicated type constructed in a novel and simple manner so as to be adjustable for the accommodation, in co-operation with an associate bracket, of curtaining means of varying dimensions.

The invention contemplates primarily the provision of a novel bracket including a bearing member adjustable to different positions in a simple manner, for co-operation with an associate bracket in efficiently supporting shade rollers of varying lengths with the shades or curtains carried thereby, in operative positions.

Other objects will appear from the description hereinafter and the features of novelty will be pointed out in the claims.

In the accompanying drawing which illustrates examples of the invention without defining its limits, Fig. 1 is a diagrammatic elevation of the novel bracket in use;

Fig. 2 is a perspective view of the novel bracket;

Fig. 3 is an enlarged section on the line 3—3 of Fig. 2;

Fig. 4 is a perspective view of another form of the novel bracket, and

Fig. 5 is a section on the line 5—5 of Fig. 4.

For purposes of illustration and description, the novel bracket is shown in a form designed primarily for rotatively supporting the conventional rollers of window shades, in operative position in the well-known way. It is to be understood that such illustration and description is not intended to define the limits of usefulness or construction of the novel bracket.

As shown in the drawing, the novel bracket comprises a plate 10 adapted to be attached to a supporting surface by means of a flange 11 extending transversely from said plate 10 preferably at an edge thereof, or by attaching said plate 10 directly in contact with a supporting face dependent upon the type of installation which is desired.

In any case either the flange 11 or the plate 10 itself is provided with apertures 12 or 12ª for the accommodation of screws or other fastening means whereby the attachment to the supporting surface is effected.

The novel bracket further comprises a bearing member 13 which in practice projects transversely from the plate 10 substantially in perpendicular relation thereto and is adjustable relatively to said plate 10 to different positions thereon. The novel bracket in addition comprises fastening means whereby the bearing member 13 is fixed in an adjusted position on said plate 10 and which, as shown in the illustrated examples, may also serve to guide the bearing member 13 in its movements of adjustment relatively to said plate 10 as will be more fully set forth hereinafter.

In the specific forms illustrated, the bearing members 13 are designed for co-operation in associated pairs and are provided with means for removably accommodating the devices whereby the shade rollers are operatively combined therewith. The one bearing member 13 of a given pair accordingly may terminate at its free end in a head 14 having a central aperture 15, as shown in Figs. 4 and 5, for the reception of the customary trunnion $a$ of a conventional shade roller $b$ carrying a shade $c$ in the usual manner, while the other bearing member 13 of said pair may terminate in a head 14ª provided with an open slot 16 as shown in Figs. 2 and 3, into which the spring lug $d$ of said roller $b$ fits in the well-known way.

In the preferred construction each plate 10 is provided with a central opening 17 of suitable shape and dimensions, and with slots 18 extending lengthwise of said plate 10 in parallel relation upon opposite sides of the opening 17. With this arrangement the bearing member 13 is carried by a slide or member 19 located in surface engagement with the rear face of the plate 10, and projects from said slide or member 19 outwardly through the opening 17 as shown in the drawing. The slide or member 19, in the illustrated examples, extends transversely across the slots 18 at the rear thereof and is provided with suitable fastening means which may be in the form of screwthreaded stems 20 fixed on the slide or member 19, or comprise separate bolts which extend through suitable bolt openings with which said slide or member 19 in such arrangement is provided.

In either case the stems 20 or equivalent bolts, project outwardly through the slots 18 and accommodate nuts 21 which by engagement with the outer face of the plate 10 clamp the slide or member 19 against the rear face thereof and thereby fix the associated bearing member 13 in its adjusted position on said plate 10.

In practice, assuming the form of bracket illustrated in Figs. 2 and 3 is being used, the flange 11 of one bracket is placed in surface engagement with the one side face e for instance of a window frame, at the desired point and secured in this position by means of screws or the like passing through the apertures 12 into said window frame. An associate bracket of the same type is then correspondingly mounted on the opposite side face e of said window frame in operative registry with the first bracket of the co-operating pair. The nuts 21 are then loosened to permit the bearing member 13 to be adjusted on the respective plates 10 to properly space the heads 14 and 14ª at the required distance apart to operatively accommodate the trunnion a and spring lug d of the shade roller b to rotatively support the same with the shade c in the desired position at the particular window. Either prior or subsequently to the combination of the shade roller b with the brackets as described, the nuts 21 are screwed into engagement with the plates 10 to fix said bearing members 13 with their heads 14 and 14ª in the adjusted positions on the respective plates 10.

In utilizing the bracket illustrated in Figs. 4 and 5, the plates 10 of two associated brackets of a given pair, are fastened in surface engagement with the inner faces f of the window frame at the desired points in operative registry with each other. Either previously or subsequently to such attachment of the plates 10 to the surfaces f the bearing members 13 of the associated brackets are correspondingly adjusted by loosening the nuts 21 and then shifting the slides or members 19 and bearing members 13 relatively to said plates 10 and then returning said nuts 21 into clamping engagement with the outer faces of said plates 10 to fix said bearing members 13 in the adjusted positions therein. The shade roller b is then operatively combined with said brackets in the same way as previously described.

When brackets of the type shown in Figs. 2 and 3 are used, the shade roller b and its shade c are mounted between the side surfaces e of the window frame. With brackets of the kind illustrated in Figs. 4 and 5, the shade roller b and its shade c are mounted in front of the window frame on the inside thereof as will be apparent. In either case the shade rollers b and the shades c carried thereby are mounted in associated relation with a given window in an efficient manner in which the operation of the shades c and rollers b is carried out at will without interference and without difficulty.

In both of the illustrated forms of the novel bracket the stems 20 or equivalent bolts, in addition to their other functions serve, in co-operation with the slots 18 to guide the bearing members 13 and associated parts in their movements of adjustment on the plates 10 and thereby facilitate such adjustment operations.

In all forms, the novel brackets provide means for efficiently supporting shade rollers and shades or their equivalents in operative positions regardless of variations in the axial length of different rollers.

The novel brackets are simple in construction and operation and are easily mounted in place on supporting surfaces, exemplified by the faces e and f of conventional window frames, without requiring any particular skill on the part of the person involved.

Although the present invention has been described in conjunction with preferred embodiments, it is to be understood that modifications and variations may be resorted to without departing from the spirit and scope of the invention, as those skilled in the art will readily understand. Such variations and modifications are considered to be within the purview and scope of the claims.

I claim:

1. A bracket of the kind described comprising a plate adapted to be attached to a supporting surface and provided with an opening, a member movably mounted on the rear face of said plate, a bearing member carried by said member and projecting therefrom outwardly through said opening beyond and in substantially perpendicular relation to said plate, said member and bearing member being adjustable relatively to said plate to different positions thereon, and means independent of the plate attachment for securing said member against movement on said plate to thereby fix said bearing member in an adjusted position thereon.

2. A bracket of the kind described comprising a plate adapted to be attached to a supporting surface and provided with an opening and with slots extending lengthwise of said plate upon opposite sides of said opening, a slide movably mounted on the rear face of said plate and extending transversely across said slots, a bearing member carried by said slide and projecting therefrom outwardly through said opening beyond and in substantially perpendicular relation to said plate, said slide and bearing member being adjustable relatively to said plate to different positions thereon, and fastening means independent of the plate attachment extending through said slots for guiding the slide and bearing member in said movements of adjustment and for fixing said slide and bearing member in an adjusted position on said plate.

3. A bracket of the kind described comprising a plate adapted to be attached to a supporting surface and provided with an opening and with slots extending lengthwise of said plate in parallel relation upon opposite sides of said opening, a slide movably mounted on the rear face of said plate and extending transversely across said slots, a bearing member integral with said slide and projecting therefrom outwardly through said opening beyond and in substantially perpendicular relation to said plate, said slide and bearing member being adjustable relatively to said plate to different positions thereon, screwthreaded stems carried by said slide and projecting therefrom outwardly through said slots for guiding the slide and bearing member in said movements of adjustment, and nuts in screwthreaded engagement with said stems and arranged by engagement with the front face of said plate to clamp said slide against movement on said plate to thereby fix said bearing member in an adjusted position thereon.

JOSEPH J. BURGESS.